United States Patent Office.

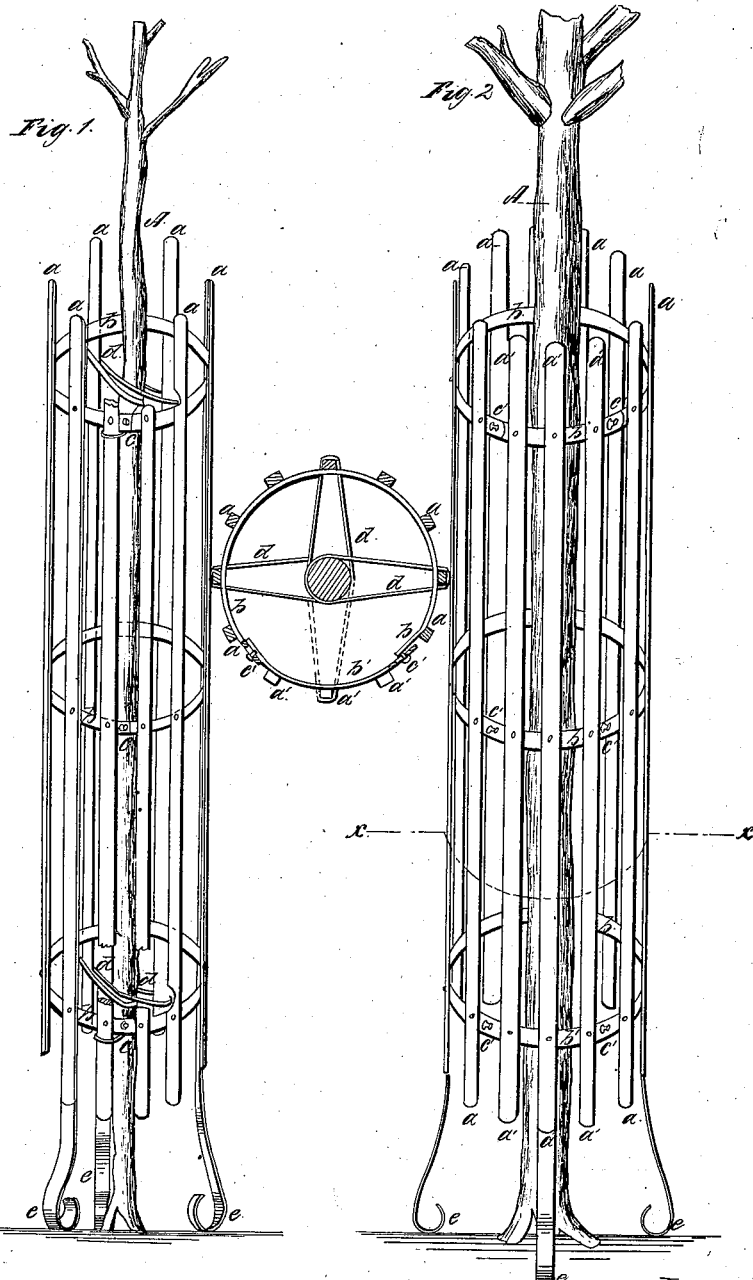

HENRY A. GRAEF OF BROOKLYN, NEW YORK.

Letters Patent No. 63,035, dated March 19, 1867.

IMPROVEMENT IN PORTABLE TREE-BOX.

*The Schedule referred to in these Letters Patent and making part of the same.*

TO ALL WHOM IT MAY CONCERN:

Be it known that I, HENRY A. GRAEF, of Brooklyn, in the county of Kings, and State of New York, have invented a new and improved Portable Box for Protecting Trees; and I do hereby declare that the following is a full, clear, and exact description thereof, which will enable others skilled in the art to make and use the same, reference being had to the accompanying drawings, forming part of this specification, in which—

Figure 1 is a perspective view of my improved portable tree-box, as applied to a young tree when first planted.

Figure 2 is a similar view of the tree-box enlarged to adapt it to the increased size of the tree after it has grown.

Figure 3 is a horizontal cross-section taken in the plane of the line $x$ $x$, fig. 2.

Similar letters of reference indicate like parts.

This invention relates to an improved mode of constructing boxes for protecting young trees when planted out where they are exposed to injury from the destruction of the bark by cattle, &c., and it consists in forming them of upright wooden slats or metal strips, which are attached to wooden or sheet-iron hoops or bands. The lower ends of three or more of the slats rest upon the ground, and the box, so constructed, is held in place around the tree by means of India-rubber or other suitable lashings, in such manner that the tree can move freely in any direction, and is not rigidly held in an upright position by the box, nor brought in contact with it to rub and cut the bark when it is swayed about by the wind, as is the case with the ordinary tree-box. Another important feature of my improved tree-box is that it may be adjusted to the size of the tree as it grows larger, by inserting more slats and expanding the circle of the box at pleasure. The box may also be removed from one tree and connected with another when necessary.

A represents a tree surrounded by my improved box, formed of upright slats or strips $a$ $a$, riveted or otherwise fastened to circular bands or hoops $b$ $b$, placed near the top and bottom and any number of intermediate points of the box. The bands $b$ $b$ are locked together at their ends by a button and slot at $c$, or in any suitable way for putting together and taking apart readily. The box is held in place at the proper distance from the tree on all sides by means of India-rubber or other suitable lashings $d$ $d$, which pass around the trunk of the tree and are fastened to the slats $a$ $a$, as shown clearly in fig. 3. In fig. 1 the box is shown as applied to a young tree when first planted. At the bottom of the box, three feet, $e$ $e$ $e$, are made by producing the slats or attaching shoe-pieces to them for supporting it so that the lower ends of the other slats shall not touch the ground and the box may sway to and fro and yield to the movement of the tree when the wind blows. In figs. 2 and 3 the box is shown as applied to a tree after it has grown larger, the size of the box being increased by introducing a section composed of three slats $a'$ $a'$ $a'$, fastened to segmental pieces of hoops $b'$ $b'$, which are secured to the original hoops $b$ $b$ by means of the buttons and slots at $c'$ $c'$. These sectional parts of a box may be made larger or smaller, as desired, and an additional lashing may be added.

What I claim as new, and desire to secure by Letters Patent, is—

1. A portable tree-box, formed of slots or strips $a$ $a$, fastened to bands or hoops $b$ $b$, and secured to the tree by lashings $d$ $d$, constructed and arranged substantially as and for the purposes herein described.

2. The hoops or bands $b$ $b$, fastened by buttons or slats, or their equivalents, in combination with sectional hoops or bands $b'$ $b'$ for enlarging the size of the box, substantially as herein set forth.

H. A. GRAEF.

Witnesses:
  WM. F. MCNAMARA,
  ALEX. F. ROBERTS.